US012608433B2

(12) United States Patent　　　　(10) Patent No.:　US 12,608,433 B2
Smith-Kipnis et al.　　　　　　　　　(45) Date of Patent:　　Apr. 21, 2026

(54) FACILITATING WEBSITE NAVIGATION WITH A PERSONALIZED CONTEXTUAL POPUP MENU OF ACTIONS

(71) Applicant: Providence St. Joseph Health, Renton, WA (US)

(72) Inventors: Adam Smith-Kipnis, Seattle, WA (US); Ryan Untalan, San Francisco, CA (US); Lisa Mason, Newcastle, WA (US); Michael Lynch, Toronto (CA); Reza Ladchartabi, Redwood City, CA (US)

(73) Assignee: Providence St. Joseph Health, Renton, WA (US)

( * ) Notice: Subject to any disclaimer, the term of this patent is extended or adjusted under 35 U.S.C. 154(b) by 174 days.

(21) Appl. No.: 18/308,383

(22) Filed: Apr. 27, 2023

(65) Prior Publication Data

US 2024/0362288 A1　　Oct. 31, 2024

(51) Int. Cl.
　　*G06F 16/954*　　(2019.01)
　　*G06F 16/957*　　(2019.01)
(52) U.S. Cl.
　　CPC ........ *G06F 16/954* (2019.01); *G06F 16/9577* (2019.01)

(58) Field of Classification Search
　　CPC .......................... G06F 16/954; G06F 16/9577
　　See application file for complete search history.

(56) References Cited

U.S. PATENT DOCUMENTS

| | | | |
|---|---|---|---|
| 9,727,646 B2* | 8/2017 | Carpenter ............. | G06F 16/951 |
| | | | 715/810 |
| 2003/0083938 A1* | 5/2003 | Smith .................... | G06Q 30/02 |
| | | | 705/14.66 |
| 2012/0151386 A1* | 6/2012 | Sun ........................ | G06F 3/0482 |
| | | | 715/810 |
| 2012/0173963 A1* | 7/2012 | Hoke ...................... | G06F 40/18 |
| | | | 715/234 |
| 2024/0296315 A1* | 9/2024 | Singh .................... | G06N 3/045 |
| | | | 715/810 |

* cited by examiner

*Primary Examiner* — Yuk Ting Choi
(74) *Attorney, Agent, or Firm* — Arnold & Porter Kaye Scholer LLP

(57) ABSTRACT

An action selection facility for a website made up of pages is described. The facility receives requests, each identifying a requested page among the website's pages, and a requesting user for whom the request was generated. For each received request, the facility: (a) identifies actions presently available to the requesting user that can be performed using the website; (b) accesses a set of action determinant factors that relate to the request, and uses them to generate a score for each identified action; and (c) selects a proper subset of the identified actions based at least in part on the scores generated for them.

20 Claims, 7 Drawing Sheets

FACILITATING WEBSITE NAVIGATION WITH A PERSONALIZED CONTEXTUAL POPUP MENU OF ACTIONS

BACKGROUND

Websites each organize information and resources into a group of webpages among which a user can navigate. For example, items of information included in a website might include text, images, or audio and/or video clips, while other resources available in a website might include forms; downloadable files or other assets; tools for searching for information, reading and responding to messages, or making and tracking appointments; various wizards or agents; etc. Some or all such resources may correspond to actions that can be performed using the website.

Formerly, it was common for websites to be organized in a narrative flow, in which a user would follow a series of individual links through a sequence of webpages that began with a root page of the website, and ended with one containing an item of information or other resource of use to the user.

More recently, it has become common to provide menus on some or all pages of a website in which a user can click on a brief description of an item of information or other resource to navigate more directly to a webpage containing it. To provide a consistent experience, it is common for the same menu(s) to be provided on every page of the same website.

DETAILED DESCRIPTION

Figure 1:
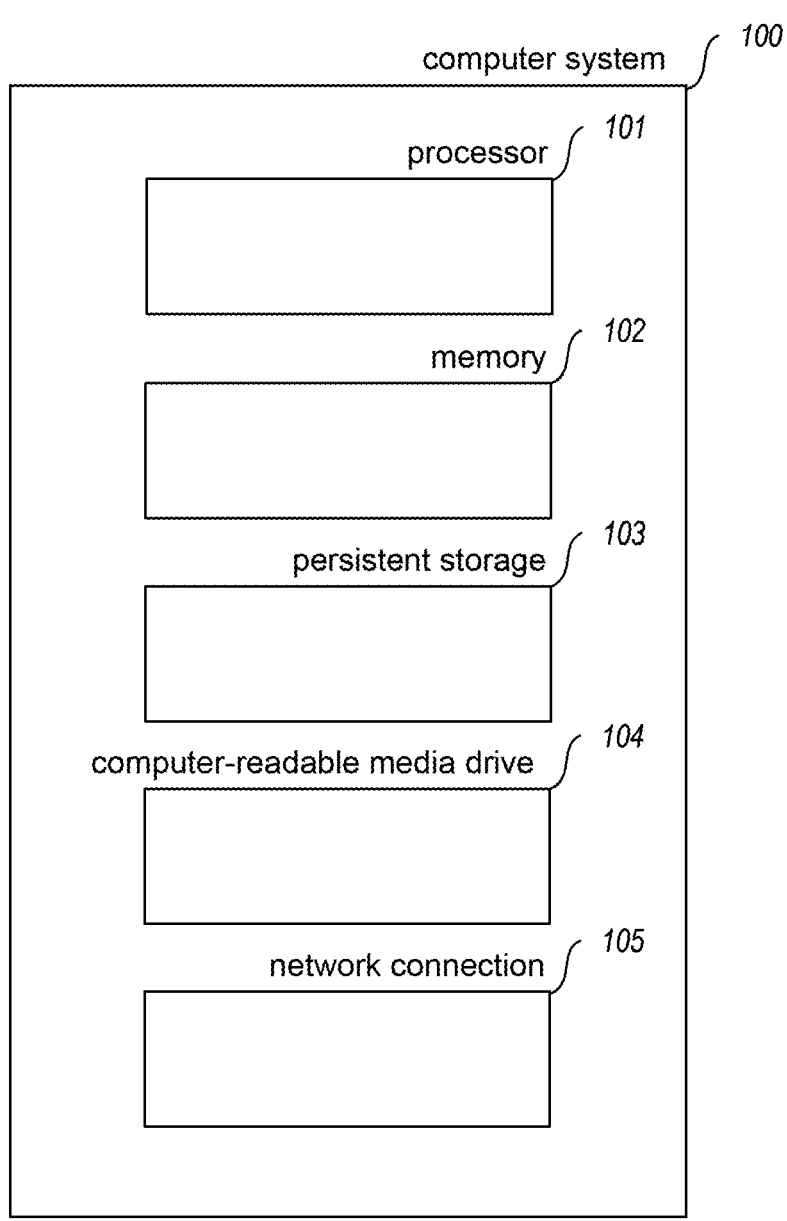
FIG. 1 is a block diagram showing some of the components typically incorporated in at least some of the computer systems and other devices on which the facility operates.

The inventors have recognized significant disadvantages in the conventional approaches to navigating to items of information or other resources or actions. For websites organized in a narrative manner, reading through and choosing links on a series of pages can be slow, and impose a significant cognitive burden to comprehend the narrative content of the pages. For websites that include menus, when the website contains more than a trivial volume of information and resources, the menus are extensive and complex—often involving submenus, or a serial series of menus, or menus that need to be scrolled—making them difficult to navigate. This is especially true for websites that include the same menu on every page. To the extent that such menus are not as extensive and complex, they run a significant risk of omitting information and resources that would be useful to a meaningful number of users.

In response to recognizing these disadvantages of conventional to navigating to items of information or other resources in a website, the inventors have conceived and reduced to practice a software and/or hardware facility for facilitating website navigation with a personalized contextual popup menu of actions ("the facility"). Hereafter, "menu" refers to the menu presented by the facility.

In various embodiments, the facility uses a variety of "action determinant factors" to identify and evaluate candidate actions to show in the popup menu presented in a particular served instance of a particular page of the website, which can include: (1) actions most frequently performed users across the entire site, with special emphasis on actions most frequently performed by the current user, or other users who share one or more characteristics of the current user; (2) characterizing information about the role of the page in the context of the website, relative to each possible action; (3) actions most commonly performed next after users have visited the page (via the menu or otherwise), in some cases with special emphasis on actions most commonly performed next by the current user, or other users who share one or more characteristics of the current user; (4) known present short-term state of the current user, based on the current user's interactions in their present visit to the website; (5) known present long-term state of the current user, based on either or both of the current user's interactions in past visits to the website, and information about the user obtained through other channels; (6) a level of urgency attributed to identified actions, either for the current user, or across all users or just those who share a characteristic with the current user. In various embodiments, known present state of the current user takes into account a variety of ways of interacting with the website, including following links, activating other controls, and/or entering natural language into a chatbot using speech and/or typing. In some embodiments, the facility uses a large language model or a transformer model to discern intent and/or a summary from entered natural language.

In some embodiments, the facility selects actions to include in the menu by accessing a set of actions currently available on the website; determines a score for each of these actions based on action determinant factors; and selects the actions for which the highest scores are determined.

In some embodiments, the facility reserves one or more buttons for actions in each of one or more certain categories, such as: actions available on the present page, or available on pages not visited during the current session among a small group of related pages; actions determined to be most urgent to the user; etc.

In some embodiments, the menu displayed by the facility is a vertical stack of buttons each for an action, such as a stack organized in descending order of action score. In some embodiments, the menu is expandable or scrollable to show additional actions having the next-highest scores relative to the first-displayed actions, such as by selecting a "show me more" button included in the menu by the facility. In various embodiments, the facility organizes the menu in a variety of other ways, including a horizontal row of buttons, a rectangular grid of buttons, a circle of buttons, etc.

By operating in some or all of the ways described above, on average, the facility enables users to perform desired website actions faster, more intuitively, and more successfully than using conventional approaches.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by reducing the number of pages served and displayed on the way to performing the action, the facility precludes consumption of the processing resources that would have been used by the webserver to serve each eliminated page request, and those that would have been used by the client to make each request and render each served page. It also precludes the network traffic that sending each eliminated page request and the resulting page would have incurred.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
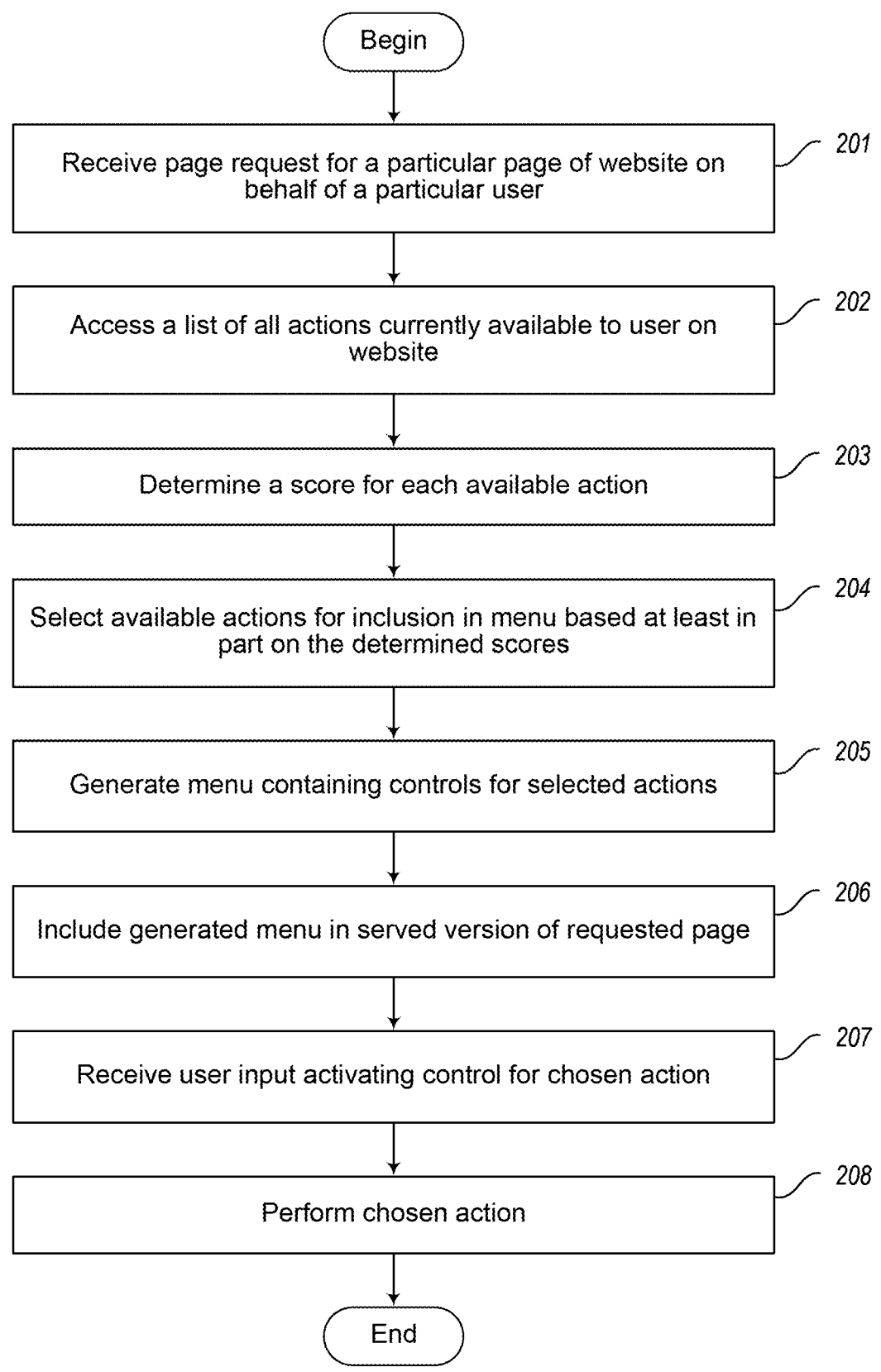
FIG. 2 is a flow diagram showing a process performed by the facility in some embodiments to generate and operate its menu in response to a page request for the website.

FIG. 2 is a flow diagram showing a process performed by the facility in some embodiments to generate and operate its menu in response to a page request for the website. In act 201, the facility receives a page request. The page request identifies a particular page of the website, and is sent on behalf of a particular user. In various embodiments, the user is identified to the facility in various ways, such as via a user ID assigned to the user. In various embodiments, the user ID is included in the page request as part of the page request's target URL, elsewhere in the page request's header or payload, inside a cookie stored on the user's client under the domain of the website, etc.

In act 202, the facility accesses the list of all actions currently available on the website to the user. In various embodiments, this list is static and consistent for all users; variant between users, but static for individual users; dynamic over time, but consistent across users at a particular time; or fully dynamic, variant both between users and over time. The facility can rely on various factors about actions in determining which to make available at a particular time. Also, the facility may add the functionality for performing new actions to the website over time, resulting in actions appearing in the list that didn't formerly exist.

In act 203, the facility determines the score for each available action. Aspects of this score determination are discussed below in connection with FIG. 3.

In act 204, the facility selects from among the available actions certain actions for inclusion in the menu. The facility performs this selection based at least in part on the scores determined in act 203. In various embodiments, the facility also or instead performs act 204 in a way that includes actions other than all of those having the highest scores, such as actions from categories judged useful for inclusion, either across all users or for the user on behalf of whom the page request was received.

In act 205, the facility generates a menu containing controls each corresponding to one of the actions selected in act 204. In act 206, the facility includes the menu generated in act 205 in a version of the requested page that the facility serves in response to receiving the page request. Details of generating and including this menu are discussed below in connection with FIGS. 4-7.

In act 207, the facility receives user input activating one of the controls of the included menu corresponding to one of the selected actions that the user chooses to perform. In act 208, the facility causes performance of the action whose choice is reflected in the user input received in act 207. In various embodiments, this involves sending or servicing an additional page request corresponding to the chosen action; calling particular code on the client and/or on the server corresponding to the chosen action; etc. After act 208, this process concludes.

Those skilled in the art will appreciate that the acts shown in FIG. 2 may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
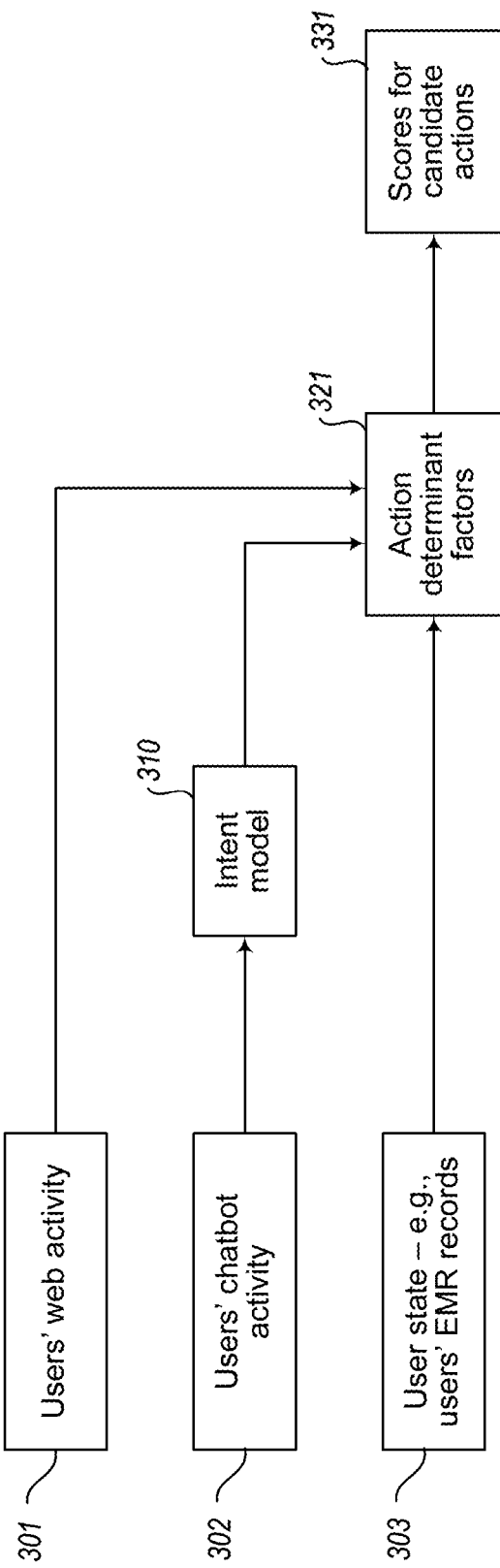
FIG. 3 is a data flow diagram showing the facility's scoring of candidate actions in some embodiments.

FIG. 3 is a data flow diagram showing the facility's scoring of candidate actions in some embodiments. The facility generates these scores 331 using one or more action determinant factors 321. In various embodiments, these factors include web activity 301 of the requesting user, as well as other users. In some embodiments, the user web activity includes information about browsing actions as well as information about actions taken, for each recent session of the user interacting with the website. From this can be derived information about the current status or intent of the user, as well as the past patterns of interacting that led to certain actions being taken, all of which is considered by the facility among the factors in some embodiments. In some embodiments, the factors include an intent derived by applying an intent prediction model 310—such as a large language model or a transformer model—to natural language text 302 provided by one or more users such as via a chatbot, such as typing the text, or such as speaking audio from which the text is transcribed. In some embodiments, the factors include state about one or more users, such as electronic medical record ("EMR") records maintained for each user. In various embodiments, this user state can involve aspects such as a history of messaging with providers; a history of in-person or video conferencing visits; a history of labs performed and their results; a history of procedures performed; and current or past status information. In various embodiments, the facility uses information from these or other sources for the requesting user; all users; and/or users who share a characteristic with the requesting user, such as age, sex, geographical region, user class, etc.

FIGS. 4-7 are display diagrams each showing the facility's generation and inclusion of a menu on a particular page of the website returned in response to a particular page request from a particular user.

Figure 4:
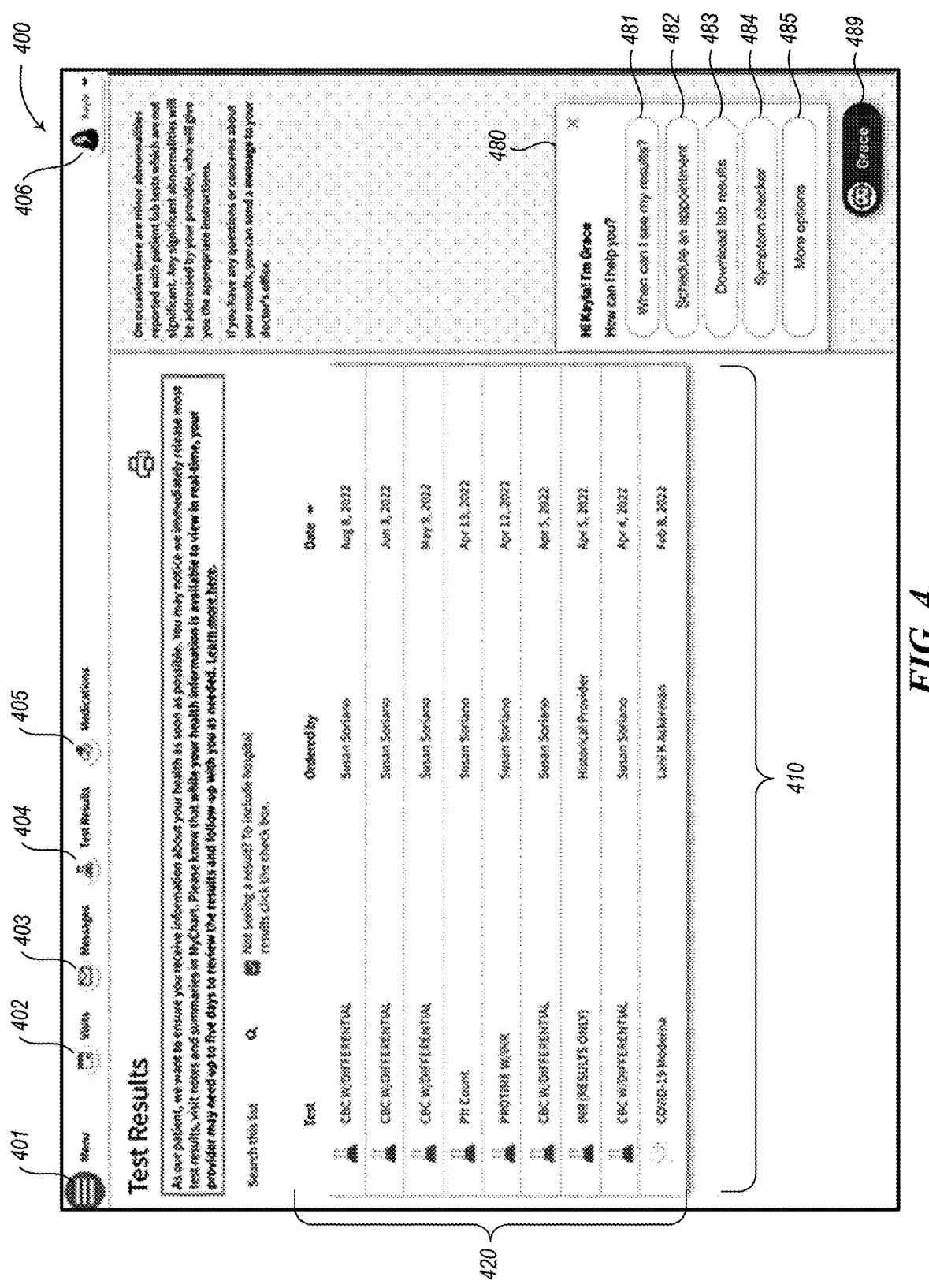
FIG. 4 is a display diagram showing a first page of the website containing a menu included by the facility.

FIG. 4 is a display diagram showing a first page of the website containing a menu included by the facility. It can be seen that the page 400 includes a menu control 401 for displaying a conventional menu of website actions and/or pages, as well as webpage or website section navigation controls 402-405 for, respectively: showing past and planned visits, changing visits, or planning new future visits; reading or sending messages to care team members; reviewing and/or posing questions about test results; and reviewing, posing questions about, and filling medications. The display also includes an indication 406 of the user who requested the page, such as a user who has logged into the website using the browser presenting display 400. The display further includes substantive section 410 relating to the user's test results 420. For example, the user may have reached this page by activating test results control navigation control 404. The display further includes menu 480, containing a vertical stack of buttons 481-485. Each of buttons 481-485 corresponds to an action that is available to the user that has been dynamically selected by the facility as relevant for the user in their present situation. The menu also includes a "more options" button 485 that the user can use to expand or scroll the menu to include other highly-scored actions not presently displayed. The display further includes a control 489 for accessing an intelligent agent, such as a chatbot that can accept typed or voice input.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 5:
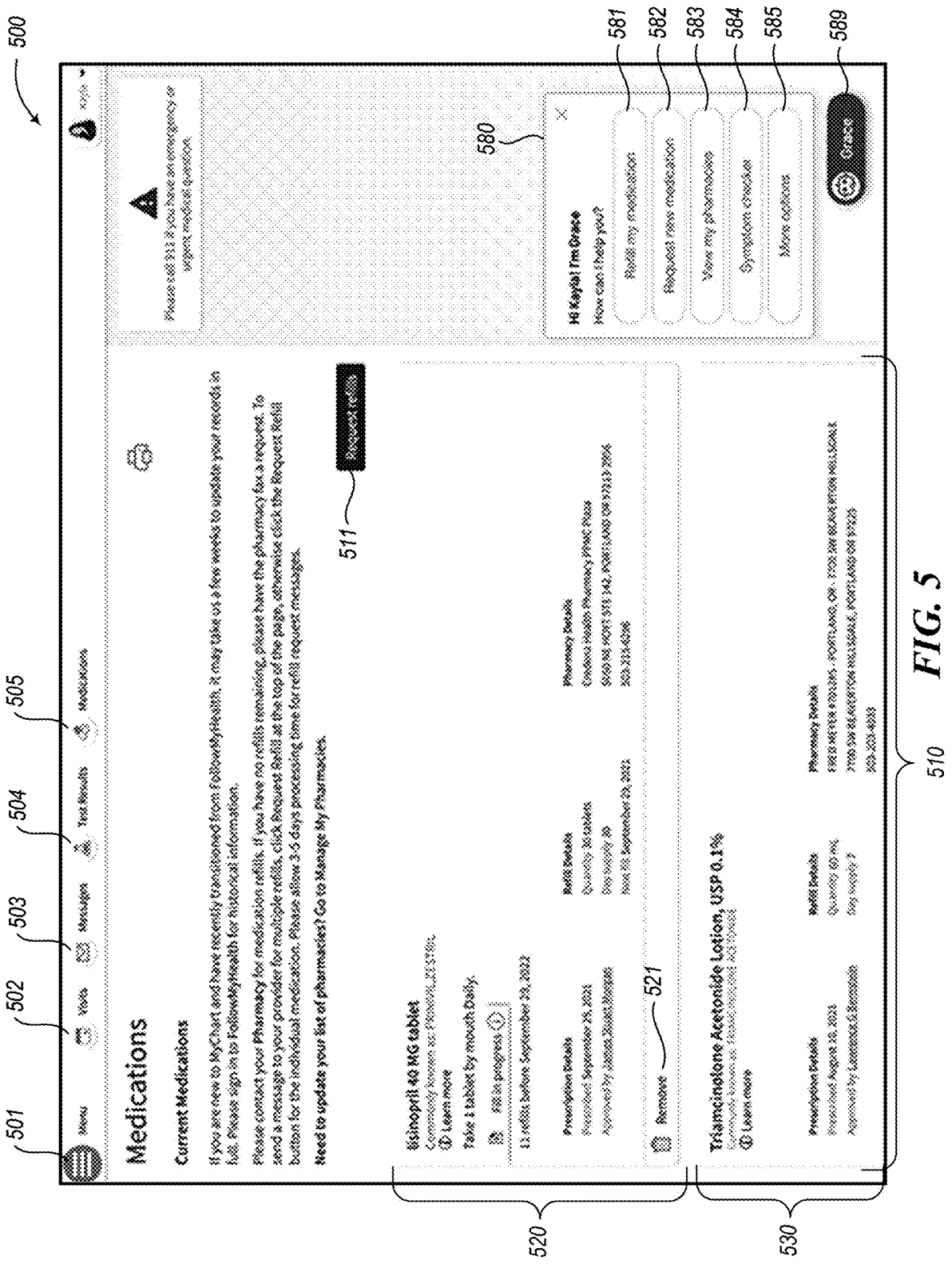
FIG. 5 is a display diagram showing a second page of the website containing a menu included by the facility.

FIG. 5 is a display diagram showing a second page of the website containing a menu included by the facility. The display 500 is similar to display 400 shown in FIG. 4. It corresponds to a medications page, as seen in its substantive content area 510. The medications page includes a control 511 that the user can activate in order to request medication refills as well as medication detail entries 520 and 530 each about a different medication prescribed or recommended to the user. Entry 520 includes a remove control 521 that the user can activate in order to remove its medication, lisinopril, from the shown list. It can be seen that menu 590 contains different actions 591-593, relating to the medications page, as well as button 584 showing the same action as button 484 shown in FIG. 4—a symptom checker action.

Figure 6:
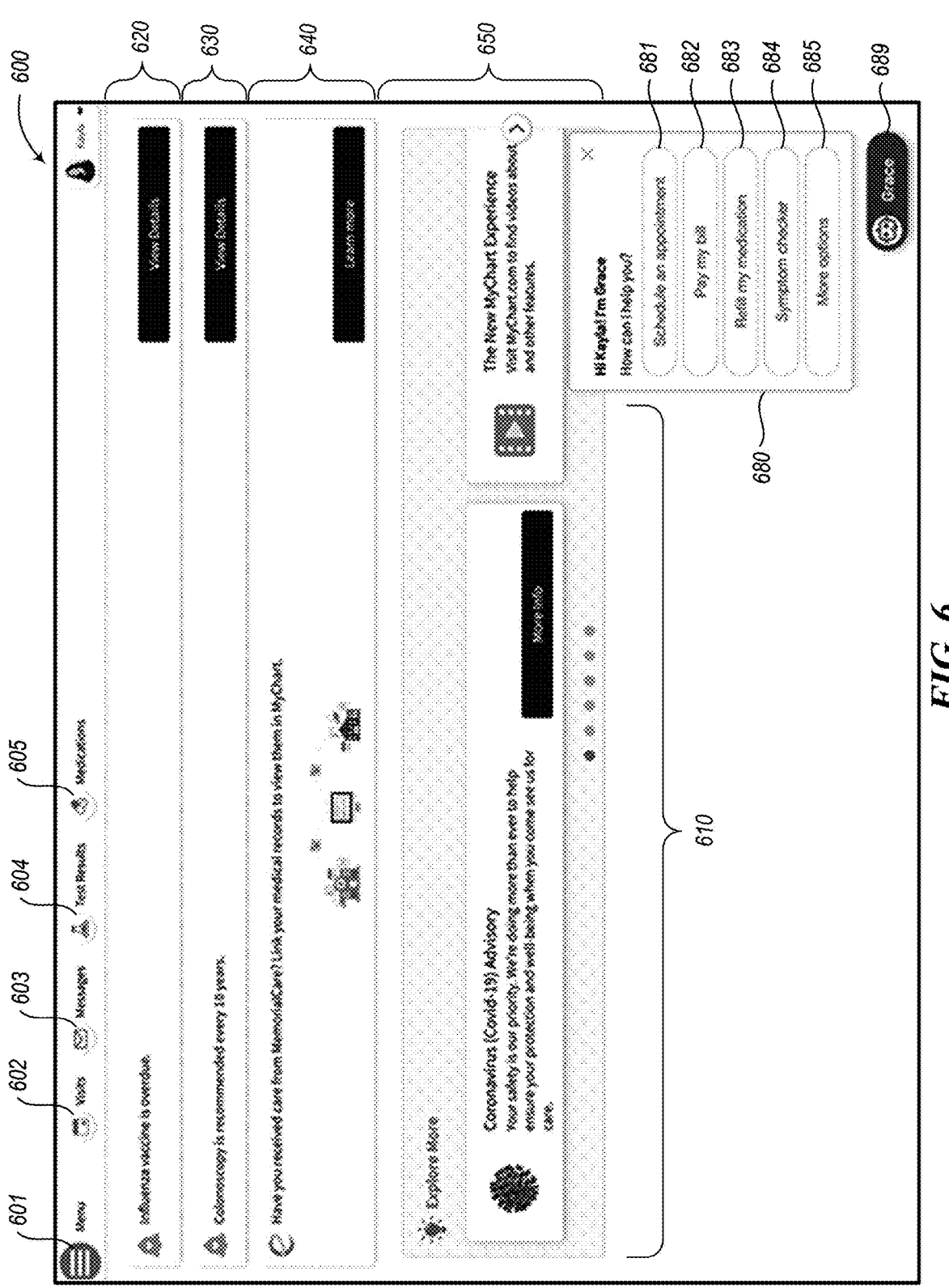
FIG. 6 is a display diagram showing a third page of the website containing a menu included by the facility.

FIG. 6 is a display diagram showing a third page of the website containing a menu included by the facility. The substantive content area 610 of display 600 shows that the page shown by display 600 is a homepage containing a variety of health notices. It can be seen that the menu 680 contains a "Refill my medication" button 683 corresponding to the same button 581 shown in FIG. 5, but at a lower rank. The menu 680 further includes a symptom checker button 684 in the same position as symptom checker buttons 484 and 584 shown in FIGS. 4 and 5 respectively.

Figure 7:
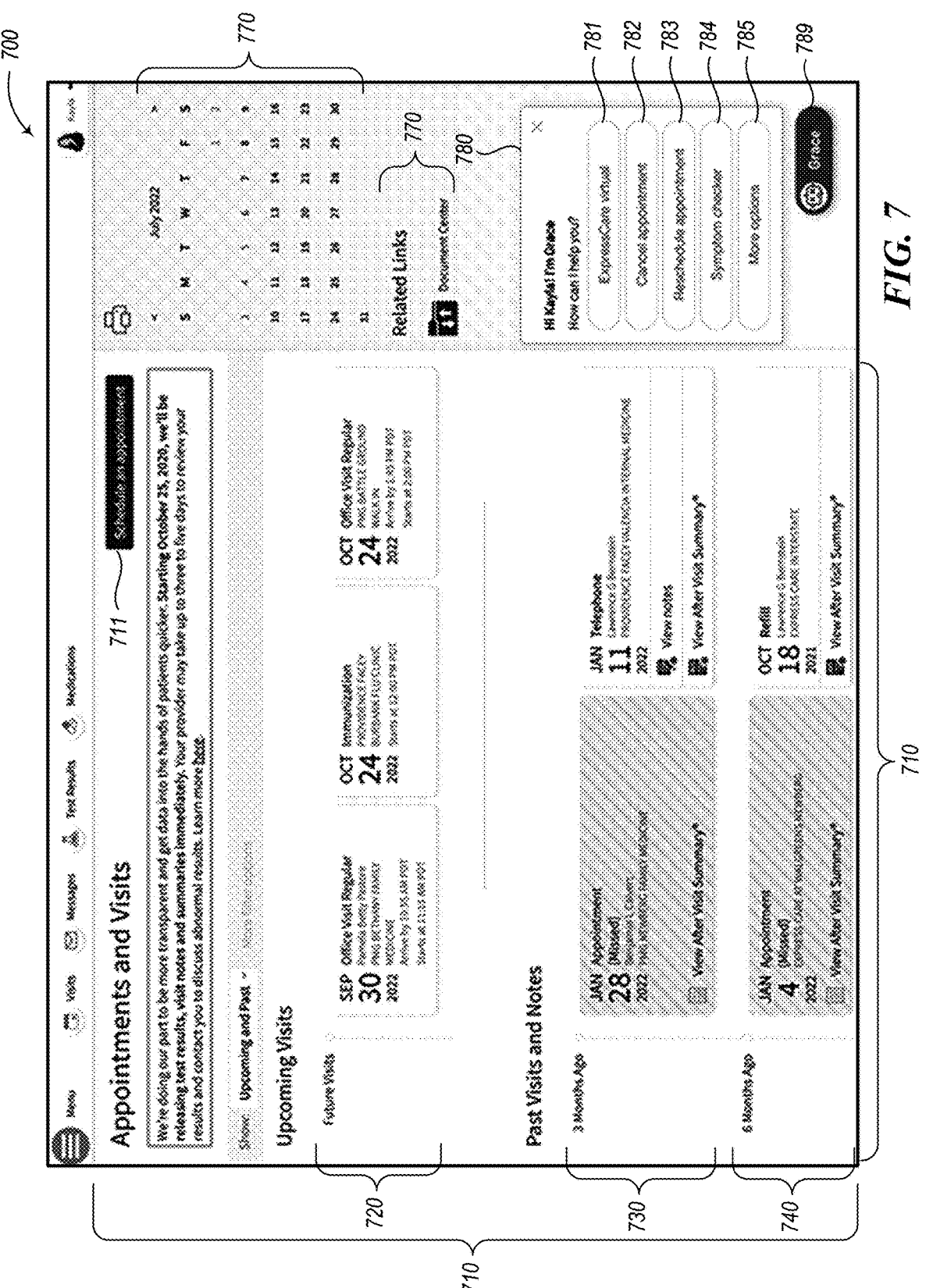
FIG. 7 is a display diagram showing a fourth page of the website containing a menu included by the facility.

FIG. 7 is a display diagram showing a fourth page of the website containing a menu included by the facility. The substantive content area 710 shows that the page in display

700 is an appointments and visits page used by the user to view, add, and change appointments. These include planned future visits 720 and past visits and corresponding information 730 and 740. The page also includes a calendar usable in viewing existing appointments and planning new appointments and a button 711 for scheduling new appointments. The page also includes a control 774 displaying a patient document center. The menu 780 contains buttons 781-783 for actions relating to appointments, as well as button 784 for symptom checker.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system with respect to a website comprised of pages, the method comprising:

receiving, by a processor of the computing system, a plurality of requests, each request identifying a requested page among the pages of the website, and a requesting user on behalf of whom the request was generated; and for each received request, in response to its receipt:

extracting, by the processor of the computing system, identification information of the requesting user;

analyzing, by the processor of the computing system, user data of the requesting user based on the identification information to identify first actions available to the requesting user to be displayed on a first section of the requested page of the website;

for each of the first actions, accessing, by the processor of the computing system, a set of action determinant factors to determine second actions available to the requesting user based on the user data;

in response to detecting an activation of one of the first actions by the requesting user on the first section of the requested page of the website, using, by the processor of the computing system, the action determinant factors and the user data to generate a score for each of the second actions;

selecting, by the processor of the computing system, a subset of the second actions based at least in part on the score generated for each of the second actions;

causing, by the processor of the computing system, to be included in an instance of the requested page served in response to the activation of one of the first actions a dynamic action menu that, for each of the subset of the second actions, contains a distinct control for performing a selected action; and displaying, by the processor of the computing system, the dynamic action menu on a second section of the requested page of the website, the subset of the second actions being prioritized in the dynamic action menu in a descending order in connection with the score generated for each of the second actions.

2. The method of claim 1 wherein, for each received request, the dynamic action menu included in the instance of the requested page served in response to the request comprises a vertical stack of buttons each for performing one of the selected actions.

3. The method of claim 1 wherein the actions include at least one action available to the requesting user on a different webpage than the requested page, and wherein operating a control associated with the at least one action available to the requesting user on the different webpage causes the at least one action to be performed on the different webpage.

4. One or more instances of computer-readable media collectively storing a data structure, the one or more instances of computer-readable media not constituting a transitory propagating data signal, the data structure comprising:

a plurality of entries, each entry corresponding to an action of a subject website that is available to a requesting user requesting a requested page from the subject website, wherein identifying information of the requesting user is extracted from each received request and user data of the requesting user is analyzed to identify one or more first actions available to the requesting user to be displayed on a first section of the requested page of the website and access, for each of the first actions, a set of action determinant factors to determine one or more second actions available to the requesting user based on the user data, each entry comprising:

a quantitative score reflecting a level of appropriateness for each of the second actions based on the action determinant factors and the user data, in response to detecting an activation of one of the first actions by the requesting user on the first section of the requested page of the website, such that a subset of the second actions is selected based at least in part on the quantitative score generated for each of the second actions, wherein the data structure comprises data for displaying an instance of the requested page served in response to the activation of one of the first actions and including a dynamic action menu that, for each of the subset of the second actions, contains a distinct control for performing a selected action, wherein the dynamic action menu is configured to be displayed on a second section of the requested page of the website, the subset of the second actions being prioritized in the dynamic action menu in a descending order in connection with the quantitative score generated for each of the second actions.

5. The one or more instances of computer-readable media of claim 4 wherein, for each of the entries, the quantitative score reflects a level of correspondence of the action with an intent predicted for the requesting user by a language model from natural language text inputted by the user.

6. The one or more instances of computer-readable media of claim 4 wherein a state is persistently maintained for the requesting user, and wherein one or more aspects of the state persistently maintained for the requesting user are reflected in the quantitative scores of at least a portion of the plurality of entries.

7. The one or more instances of computer-readable media of claim 6 wherein the one or more aspects of the state persistently maintained for the requesting user that are reflected in the quantitative scores of at least a portion of the plurality of entries are accessed within an electronic medical record system.

8. The one or more instances of computer-readable media of claim 4 wherein browsing activities with respect to the subject website by the requesting user are reflected in the quantitative scores of at least a portion of the plurality of entries.

9. The one or more instances of computer-readable media of claim 8 wherein the request for the requested page is part of a first browsing session, and wherein the browsing activities reflected in the quantitative scores of at least a portion of the plurality of entries are browsing activities within the first browsing session.

10. The one or more instances of computer-readable media of claim 8 wherein the request for the requested page is part of a first browsing session, and wherein the browsing activities reflected in the quantitative scores of at least a portion of the plurality of entries are browsing activities within browsing sessions that preceded the first browsing session.

11. The one or more instances of computer-readable media of claim 4 wherein the quantitative scores of at least a portion of the plurality of entries reflect a rate at which the requesting user performs the action to which the entry corresponds as the next action after requesting the requested page.

12. The one or more instances of computer-readable media of claim 4 wherein the quantitative scores of at least a portion of the plurality of entries reflect a rate at which all users of the subject website perform the action to which the entry corresponds as the next action after requesting the requested page.

13. The one or more instances of computer-readable media of claim 4 wherein the quantitative scores of at least a portion of the plurality of entries reflect a rate at which users of the subject website that share a selected user characteristic with the requesting user perform the action to which the entry corresponds as the next action after requesting the requested page.

14. The one or more instances of computer-readable media of claim 4 wherein the quantitative scores of at least a portion of the plurality of entries reflect a level of urgency attributed to the action to which the entry corresponds.

15. The one or more instances of computer-readable media of claim 4 wherein the quantitative scores of at least a portion of the plurality of entries reflect a role of the requested page predicted by a language model based on natural language content of the requested page.

16. One or more instances of computer-readable media collectively having contents configured to cause a computing system to perform a method with respect to a website comprised of pages, the one or more instances of computer-readable media not constituting a transitory propagating data signal, the method comprising:

receiving, by a processor of the computing system, a plurality of requests, each request identifying a requested page among the pages of the website, and a requesting user on behalf of whom the request was generated; and for each received request, in response to its receipt:

extracting, by the processor of the computing system, identification information of the requesting user;

analyzing, by the processor of the computing system, user data of the requesting user based on the identification information to identify first actions available to the requesting user to be displayed on a first section of the requested page of the website;

for each of the first actions, accessing, by the processor of the computing system, a set of action determinant factors to determine second actions available to the requesting user based on the user data;

in response to detecting an activation of one of the first actions by the requesting user on the first section of the requested page of the website, using, by the processor of the computing system, the action determinant factors and the user data to generate a score for each of the second actions;

selecting, by the processor of the computing system, a subset of the second actions based at least in part on the score generated for each of the second actions;

causing, by the processor of the computing system, to be included in an instance of the requested page served in response to the activation of one of the first actions a dynamic action menu that, for each of the subset of the second actions, contains a distinct control for performing a selected action; and displaying, by the processor of the computing system, the dynamic action menu on a second section of the requested page of the website, the subset of the second actions being prioritized in the dynamic action menu in a descending order in connection with the score generated for each of the second actions.

17. The one or more instances of computer-readable media of claim 16, wherein, for each received request, the dynamic action menu included in the instance of the requested page served in response to the request comprises a vertical stack of buttons each for performing one of the selected actions.

18. The one or more instances of computer-readable media of claim 16, the method further comprising:

for a distinguished one of the received requests:

receiving an indication that the requesting user activated the control for performing a distinguished one of the selected actions; and in response to receiving the indication, causing the distinguished action to be performed on behalf of the distinguished user.

19. The one or more instances of computer-readable media of claim 16, wherein, for each received request, the dynamic action menu included in the instance of the requested page served in response to the request further comprises a control for modifying the menu to display controls for performing one or more additional available actions.

20. The one or more instances of computer-readable media of claim 16, the method further comprising:

for a distinguished one of the received requests:

receiving natural language input from the requesting user;

applying a language model to the received natural language input to predict an intent of the received natural language input, and wherein the predicted intent is among the accessed set of action determinant factors.

* * * * *